| United States Patent [19] | [11] 3,994,821 |
| Seidenberger | [45] Nov. 30, 1976 |

[54] SPILL CONTROL COMPOSITION AND USE THEREOF

[75] Inventor: James W. Seidenberger, Bethlehem, Pa.

[73] Assignee: J. T. Baker Chemical Company, Phillipsburg, N.J.

[22] Filed: Oct. 22, 1975

[21] Appl. No.: 624,590

[52] U.S. Cl. .............................................. 252/192
[51] Int. Cl.² ....................... C09K 3/32; B01J 1/22; A62D 3/00
[58] Field of Search ................ 252/192, 189, 259.5, 252/88, 443, 461; 34/DIG. 1

[56] References Cited
UNITED STATES PATENTS

| 475,586 | 5/1892 | Mauro | 252/259.5 |
| 2,073,398 | 3/1937 | Chesny | 252/189 |
| 2,270,025 | 1/1942 | Ruhoff | 252/192 |
| 2,601,862 | 7/1952 | Thomson | 252/88 |
| 2,997,445 | 8/1961 | Nuhn | 252/192 |

*Primary Examiner*—Benjamin R. Padgett
*Assistant Examiner*—Irwin Gluck
*Attorney, Agent, or Firm*—George W. Rauchfuss, Jr.; Eugene O. Retter

[57] ABSTRACT

A spill of a mineral acid is controlled and cleaned up by being absorbed into a granular composition containing ground marble chips, granular soda, granular magnesia and an appropriate normally solid pH indicator.

7 Claims, No Drawings ial acids.

SPILL CONTROL COMPOSITION AND USE THEREOF

FIELD OF THE INVENTION

The present invention relates to a composition for controlling and cleaning up spilled mineral acids.

BACKGROUND OF THE INVENTION

The properties of mineral acids are such that these acids can cause serious and painful burns to exposed skin or eyes. Moreover, spills of concentrated mineral acids evolve irritating and harmful fumes which can also lead to deleterious results. Spilled concentrated mineral acids should therefore not be allowed to contaminate the air and water. Generally reaction of the concentrated mineral acids with water and/or most neutralizing substance involves the evolution of much heat and is therefore avoided.

Therefore, there is a need for a composition of matter for controlling and cleaning up spilled mineral acids at a relatively safe rate and at a cost that is not prohibitively expensive.

SUMMARY OF THE INVENTION

It has now been found that a granular composition composed of ground marble chips, granular soda, granular magnesia and an appropriate normally solid pH indicator is especially used for the control and cleanup of spilled mineral acids.

DETAILED DESCRIPTION OF INVENTION

The granular composition useful for the purpose of this invention is composed of about 36.5 to 47.5% by weight of ground marble chips, about 35 to 45.5% by weight granular soda, about 16.5 to 21.5% by weight granular magnesia and about 0.008 to 0.012% by weight of an appropriate normally solid pH indicator.

The ground marble chips, $CaCO_3$, is preferably of a particle size such that about 100% passes through a U.S. No. 4 sieve with less than about 20% passing through a U.S. No. 100 sieve. The granular soda (soda ash-anhydrous $Na_2CO_3$) is preferably of a particle size such that about 95% passes through a U.S. No. 10 sieve with less than about 5% passing through a U.S. No. 40 sieve. The granular magnesia, MgO, is preferably of a particle size such that about 100% passes through a U.S. No. 8 sieve with less than about 10% passing through a U.S. No. 40 sieve. The particle size of the granular solid pH indicator is not critical to the invention.

A preferred composition of the invention may be defined as comprising:

A. 41.99 parts ± 10% ground marble chips ($CaCO_3$), of a particle size that about 100% passes through a U.S. No. 4 sieve with less than about 20% passing through a U.S. No. 100 sieve, B. 40.00 parts ± 10% granular soda ($Na_2CO_3$), of a particle size that about 95% passes through a U.S. No. 10 sieve with less than about 5% passing through a U.S. No. 40 sieve, C. 18.00 parts ± 10% granular magnesia (MgO), of a particle size that about 100% passes through a U.S. No. 8 sieve with less than about 10% passing through a U.S. No. 40 sieve, and D. 0.01 ± 10% granular solid pH indicator, preferably bromophenol blue indicator, wherein the parts are expressed as parts by weight.

An especially preferred composition comprises one having about 41.99 parts ground calcium carbonate, about 40 parts granular sodium carbonate, about 18 parts magnesium oxide, and about 0.01 parts bromophenol blue indicator wherein the parts are parts by weight and the particle sizes are as hereinbefore set forth.

A suitable solid granular pH indicator for use in the granular composition of this invention is any suitable pH indicator evidencing a perceptible color change in the range of pH from about 2.0 to 10.0. Especially preferred is a solid granular pH indicator evidencing a perceptible color change in the range of pH from 2.5 to 5.0. Especially preferred as the pH indicator is bromophenol blue evidencing such color change in the pH range of 3.0 to 4.6. As examples of other suitable solid granular pH indicators useful in the granular compositions of this invention there may be mentioned phenolphthalein, curcuma, methyl orange, methyl red, m-nitrophenol, p-nitrophenol, bromophenol red, chlorophenol red, bromophenol blue, bromcresol green, bromcresol purple, cresol purple, cresol red, thymol blue and the like. Bromophenol blue is especially preferred because of its color change in the range 3.0 to 4.6 and also because its color change from yellow to blue is more easily perceptible than the color change from yellow to green especially in males with color blindness. The pH indicator is normally solid, that is, is a solid at room temperature.

The granular spill control composition of this invention is especially formulated to provide a safe and effective means of controlling and cleaning up a spill of mineral acid without excess evolution of heat and fumes. The compositions of this invention permit the dangerous acidic level of the spilled mineral acid to be quickly reduced by the sodium carbonate granules so as to remove the immediate extremely hazardous nature of the spill. Thereafter the ground calcium carbonate completes the neutralization as a slower, cooler and safer rate with the magnesium oxide component acting as an absorbent for the reaction product slurry as well as also functioning as a slow neutralization agent.

As examples of mineral acids that may have spills thereof controlled and cleaned up by the granular composition of this invention there may be mentioned hydrobromic acid, hydroiodic acid, hydrochloric acid, nitric acid, phosphoric acid, sulfuric acid and mixed mineral acids.

Following a mineral acid spill a granular composition of this invention may be employed to control and clean up substantially all the spilled mineral acid by applying the granular composition to the spill surface, preferably from the perimeter inward, in a quantity sufficient to absorb all the spilled acid. The spilled mineral acid will be absorbed into the granular composition whereafter evolution of gas will begin indicating neutralization of the spilled mineral acid is proceeding. Observation of the color change of indicator in the slurry will indicate when the slurry has reached an essentially safe pH condition for further handling. In the case of a granular composition containing bromophenol blue as the solid pH indicator a change from red/yellow to blue/green will indicate such a safe state. After the slurry has reached a persistent blue/green color throughout, the slurry can be readily scraped off the spill surface by use of any suitable scoop, preferably plastic, and placed into any suitable waste disposal container, for example, a plastic disposal bag, and disposed of in accordance with any applicable environmental disposal regulations.

From the foregoing it will be seen that a composition and method have been provided which will eliminate quickly and easily the hazard to persons working under conditions susceptible to spillage of mineral acids.

It will be understood that the embodiments discussed herein and the use for the embodiments are merely illustrative of my invention and that one skilled in the art can make suitable modifications thereof without departing from the spirit and intent of the invention.

What is claimed is:

1. A granular composition useful for the control and cleanup of mineral acid spills comprising: about 36.5 to 47.5% by weight of ground calcium carbonate; about 35 to 45.5% by weight of granular sodium carbonate; about 16.5 to 21.5% by weight granular magnesium oxide and about 0.008 to 0.012% by weight of a solid granular pH indicator changing color in the range of pH 2.0–10.0.

2. The composition of claim 1 wherein the ground calcium carbonate is of a particle size such that about 100% passes through a U.S. No. 4 sieve with less than about 20% passing through a U.S. No. 100 sieve; the granular sodium carbonate is of a particle size such that about 95% passes through a U.S. No. 10 sieve with less than about 5% passing through a U.S. No. 40 sieve; and the granular magnesium oxide is of a particle size such that about 100% passes through a U.S. No. 8 sieve with less than about 10% passing through a U.S. No. 40 sieve.

3. The composition of claim 2 wherein the solid granular indicator changes color in the range of pH 2.5 to 5.0.

4. The composition of claim 3 wherein the solid granular pH indicator is bromophenol blue.

5. The composition of claim 4 comprising about 41.99 parts by weight ground calcium carbonate, about 40 parts by weight granular sodium carbonate, about 18 parts by weight granular magnesium oxide and about 0.01 parts by weight bromophenol blue.

6. A method for the control and cleanup of spilled mineral acid comprising contacting said spilled mineral acid with a composition of claim 1 and disposing of the resulting slurry after the change in color of the pH indicator in the slurry evidences that the slurry has reached an essentially safe pH condition.

7. A method for the control and cleanup of spilled mineral acid comprising contacting said spilled mineral acid with a composition of claim 5 and disposing of the resulting slurry after the change in color of the pH indicator evidences that the slurry has reached an essentially safe pH condition.

* * * * *